Sept. 12, 1950     S. K. BAKER     2,522,249
DIVERTER VALVE DEFLECTOR

Filed March 23, 1946     2 Sheets-Sheet 1

Inventor
SAMUEL K. BAKER,
By Donald W. Farrington
Attorney

Sept. 12, 1950  S. K. BAKER  2,522,249
DIVERTER VALVE DEFLECTOR

Filed March 23, 1946  2 Sheets-Sheet 2

Inventor
SAMUEL K. BAKER,

By Donald W. Farrington
Attorney

UNITED STATES PATENT OFFICE 2,522,249

DIVERTER VALVE DEFLECTOR

Samuel K. Baker, Middle River, Md., assignor to The Glenn L. Martin Company, Middle River, Md., a corporation of Maryland Application March 23, 1946, Serial No. 656,592

7 Claims. (Cl. 137—139)

This invention relates to an improvement in rotary valves and more specifically to a deflector for directing the flow of fluid passing therethrough away from the valve gate of a rotary valve. Valves of this type in which a rotor is moved to opened and closed port positions by a solenoid are well known and have many applications in conjunction with modern equipment. One of these applications is that of a diverter valve in the oil system of an aircraft engine wherein such a valve is used to by-pass the engine lubricating oil from its normal flow through a cooling radiator and main source of supply tank during a warm-up period of operation, and in turn restore the oil to its normal flow under normal operating conditions after the engine oil has reached a certain predetermined operating temperature. It is customary practice to motivate the operation of such a diverted valve by means of a thermostatically controlled solenoid. This type of valve control has proved satisfactory when operated as a by-passing means during the warm-up period, but has proved defective when operated under normal flight conditions. The aforestated defective operation consists of the diverter valve allowing a partial escape of the oil pumped from the engine by the scavenger pump directly into the supply line without being passed through the main oil reservoir during normal flight operation. Such undesired escapage of oil into the supply line causes a malfunctioning of the oil system due to the presence of air in the oil as it is pumped back into the engine.

It is conventional practice in aircraft operation to immediately remove the oil from the engine crank case after it has served its purpose as a lubricant by means of a scavenger oil pump so as to avoid an undesirable accumulation of excess oil in the engine crankcase. The oil when so removed is highly aerated due to its contact with the air existing inside of the engine as it is thrown off the moving parts, as well as large quantities of air sucked up with the oil by the scavenger oil pump making the oil unsuitable for immediate use in an engine operating under load. Removal of the air is readily accomplished by pumping the aerated oil into the main reservoir where sufficient capacity is provided to allow the air to percolate to the top with the undiluted oil settling to the bottom ready for reuse. Therefore, it is essential that all of the oil removed from the engine be properly controlled to insure that aerated oil is first caused to pass back into the main reservoir before being pumped into an engine operated under load. The function of the diverter valve is to properly divert the flow of oil from the scavenger oil pump through the cooling system and into the main reservoir from the by-pass warm-up flow route as soon as normal flight temperatures are attained. The aforementioned malfunctioning of the oil system is indicated to the pilot by variations in the oil pressure as indicated by fluctuations of the oil gauge mounted on his instrument board to show the oil pressure on the oil line between the oil pump and engine. It has been found that escape of the aerated oil into the supply line is caused by the valve gate of the diverter valve oscillating to and fro sufficiently to open the by-pass port from its closed position. This oscillation or flutter of the valve gate is caused by the aerated oil striking directly against the end of the valve gate in its closed position.

The present invention provides a novel device for controlling the flow of oil in a rotary type valve that includes a deflector positioned at the oil entrance port adjacent the valve gate to direct a flow of oil passed through the valve in a controlled course away from the port closing portion of the valve gate, so as to eliminate undesired oscillation of the valve gate caused by the aerated oil striking against said member.

It is among the objects of this invention to provide a deflector having a controlled deflecting surface for insertion in a rotary diverter valve of an aircraft lubricating system ahead of the valve gate so that the main stream of oil pumped into the valve is deflected away from the gate of the valve when in a non-diverting position and thereby eliminate undesired oscillation of the gate caused by a surging condition prevalent in such an oil stream.

A further object is to provide a valve having a novel means of controlling the course of the flow of fluid therethrough when in an open position.

A still further object of this invention is to provide a deflector for a rotary valve by which the flow of fluid passing therethrough is directed in a straight line away from the valve gate of said valve when positioned for direct passage of the fluid.

Another object is to provide a deflector suited for installation in the standard form of rotary diverter valve capable of directing the course of flow through said valve.

Other objects of this invention will become apparent from the following description when taken in conjunction with the drawings in which like numerals refer to like parts in different views.

In the drawings:

Figure 3 is an enlarged exploded view of the valve gate and deflector assembly.

Figure 1:
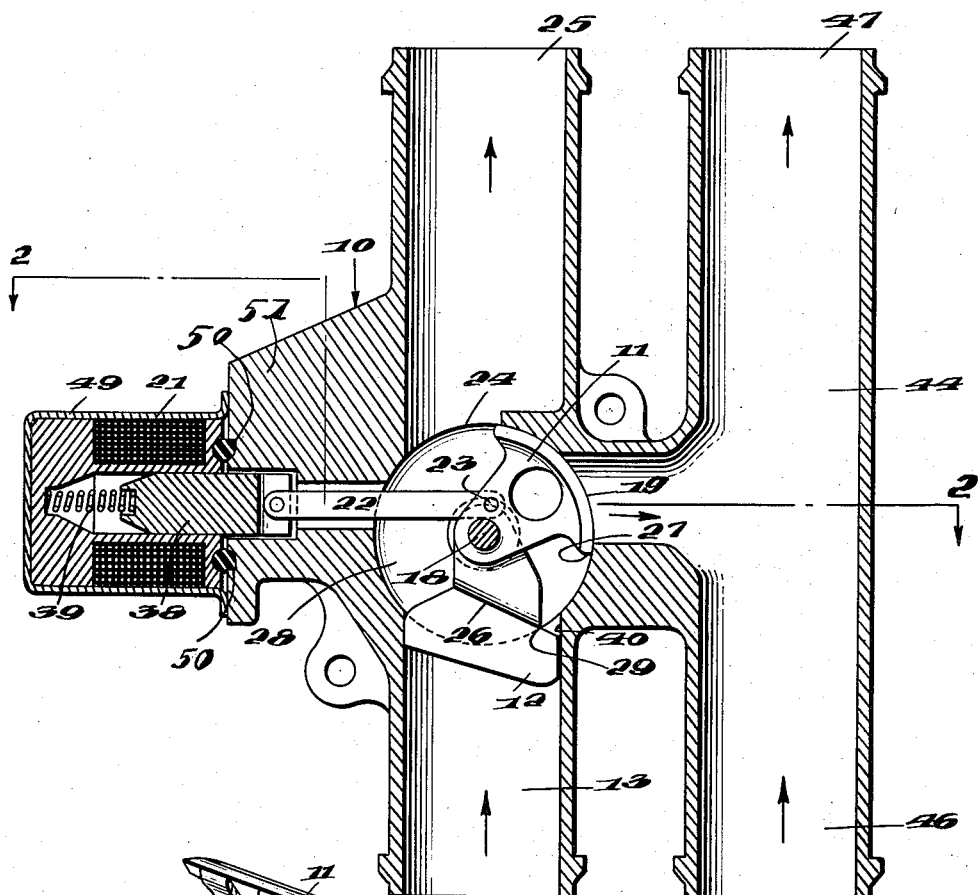
Figure 1 is a cross-sectional view showing the deflector equipped rotary valve of my invention in its normal non-diverting position.

Referring in detail to the drawings, Figure 1 illustrates the valve 10 of this ivention in which a deflector is positioned adjacent the rotor gate 11 so as to control the flow of fluid entering the valve 10 through an inlet passage 13. The deflector consists of two pieces of sheet metal stock of suitable gauge aluminum alloy, or like material, shaped and secured together to form a flat bottomed U-channel having a dependent center plate 12 and upright side arms 14 and 15 provided with apertures 16 and 17 at their ends. The length and spacing of arms 14 and 15 is such as to permit positioning of said arms adjacent the outside ribs 45 of the valve gate 11 with the bottom portion of the channel spaced between the valve gate 11 and inlet passage 13 when assembled for operation. The flat bottom portion of the channel is arranged at an angle relative to a line drawn transverse to the axial center line of inlet passage 13 to provide a deflecting surface 26 at the bottom side of the channel that slopes upwardly toward the outlet port 24. Apertures 16 and 17 are positioned relative to the ends of said arms 14 and 15 to allow for mounting of the arms on the shaft 18 of the valve 10 so that the center plate 12 formed at the bottom of the channel depends into inlet passage 13 and extends crosswise thereto securing the deflector assembly against displacement during operation of the valve. The shaft 18 is centered in valve cavity 28 transverse to inlet passage 13 and secured at each end by the side walls of the valve structure and is formed with a reduced diameter middle portion 20 to provide clearance for link 22 of the solenoid. The valve gate 11 is mounted thereon and restricted to limited rotary movement around said shaft 18 from a normal closed position closing off by-pass port 19 to an open position of by-pass port 19 and in turn closing off outlet port 24 leading into outlet passage 25 of the valve. Operation of the valve gate 11 is accomplished by means of a solenoid unit formed as a part of the diverter valve 10. This unit consists of a solenoid coil 21 placed to surround and exert a magnetic force upon a plunger 38 held in an extended position by the urge of a spring 39 enclosed by a shell 49 adapted for securing to the valve housing 51 by screws 48, or like securing means. A seal 50 is provided between the solenoid coil 21 and valve housing 51 to prevent leakage of oil from the unit.

The valve gate 11 is held in its normal position by the urge of the spring 39 acting upon the plunger 38 connected by a link 22 to pivot point 23 mounted on the gate 11 off center from the axis of shaft 18 about which the gate 11 is mounted for rotative movement. Movement of the gate 11 from said normal closed position is accomplished by energization of the solenoid coil 21 positioned to motivate plunger 38 which upon retraction against the urge of spring 39 operates through link 22 and pivot point 23 to move the rotor gate 11 to a closed position directing the flow of fluid in valve cavity 28 out through port 19. With the gate in this position, which may be referred to also as the by-pass position, ample passage area is provided by slotted openings 43 (Fig. 3) in the valve gate structure to permit free flow of oil through the elongated opening of by-pass port 19. The aforementioned operation of valve gate 11 to close off port 24 so as to direct the flow of fluid entering through inlet 13 is utilized in the operation of an aircraft cooling system during the warm-up period at which time it is desirable to divert the flow of lubricating oil direct from the engine into a small capacity hopper 42 (Fig. 4) from which hopper the oil is returned directly to the engine 30. However, after the engine has been warmed up and has attained sufficient temperature to be safely operated under load, the solenoid 21 is deenergized allowing the gate 11 to return to its normal position as shown in Figure 1 to close off by-pass port 19 and direct all of the oil entering inlet passage 13 from the engine to pass out through outlet 25 to a duct leading into the main body 34 of the supply tank 35 which serves as an oil reservoir. Under normal operation of the cooling system with gate 11 in its normal position as shown in Figure 1 it is desirable that all of the oil, except for a small amount of leakage inherent with a valve of this type, entering inlet passage 13 pass out through outlet 25 into the main body 34 of the supply tank 35, however, the oil entering inlet passage 13 is pratcically always in a highly aerated condition due to the normal characteristic of the scavenger oil pump 31 (Fig. 4) of the engine 30 to suck up comparatively large quantities of air from within the engine with the oil. In this aerated condition the oil has a tendency to intermittently increase and decrease the pressure on valve gate 11 causing it to oscillate to and fro allowing a certain amount of the oil to escape through by-pass port 19 into the by-pass line and be returned to the engine supply pump 37 (Fig. 4) too quickly carrying quantities of air therewith resulting in this malfunctioning of the oil system. The aerated condition of such oil is reflected by a rapidly fluctuating pressure in the oil stream delivered to the engine by the oil supply pump 37 as indicated on gauge 41.

Figure 2:
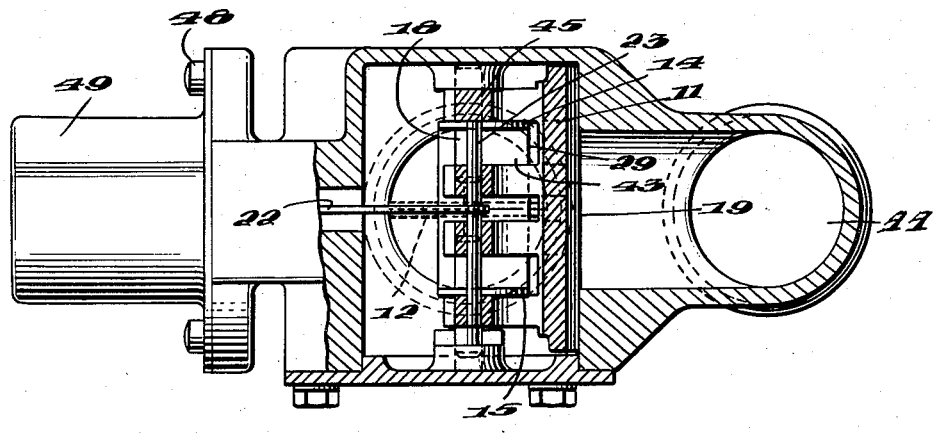
Figure 2 is a vertical sectional view on line 2—2 of Figure 1.

The function of the deflecting surface 26 which slants upwardly in the direction of the oil stream is to deflect the main flow of oil away from the exposed face 27 of the valve gate 11 into cavity 28 of the valve relieving face 27 of the force imposed thereon and so as to effect elimination of the tendency of the gate to oscillate under such, or similar, an operating condition. The deflector surface 26 is terminated with a downwardly extending edge 29 spaced a sufficient distance from side wall 40 of inlet passage 13 to allow a sufficient quantity of oil to pass between the deflector and said side wall to offset any tendency of the oil to swirl around shaft 18 as the main stream of oil is directed through the circular valve cavity 28 during a normal full load period of operation. The side walls 14 and 15 of the deflector are spaced a sufficient distance apart as to allow for unimpeded operation of the gate 11 positioned therebetween when mounted on shaft 18 as shown in Figures 1 and 2. The overall dimensions of the center plate 12 are such as to provide a close fit inside of the inlet passage 13 when in assembled position and thereby avoid any undesired movement which might change the angle of the deflecting surface 26 relative to the orifice of passage 13, or rotative movement of the deflector around shaft 18.

Figure 4:
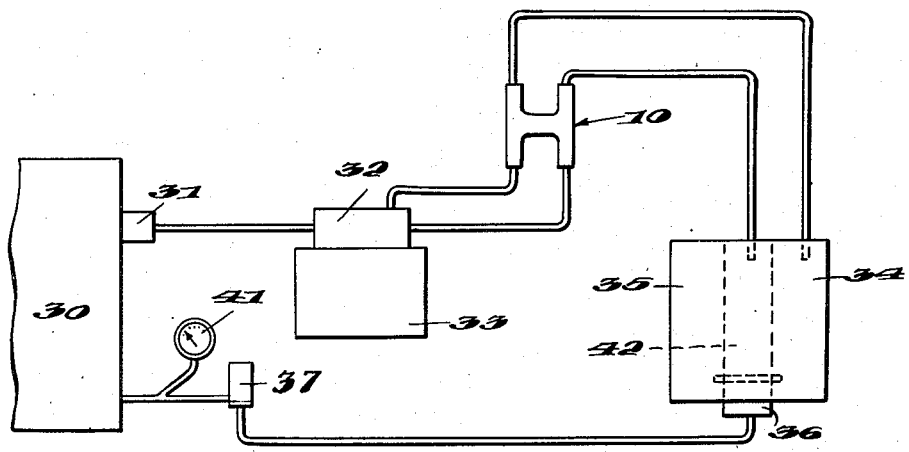
Figure 4 is a schematic view of an aircraft lubricating oil cooling system illustrating application of the deflector equipped diverter valve of this invention.

The operation of this invention is to automatically deflect the stream of oil or similar fluid passing through a diverter valve away from the rotor gate of such valve as previously described, and more specifically when used as an operating device in an aircraft lubricating oil cooling system as illustrated in Figure 4 which shows an engine 30 from which the oil is pumped by a scavenger pump 31 to a standard type of control valve 32, such as is described in Patent No. 2,383,878, issued August 28, 1945, to Leslie T. Miller, thence the oil stream is either directed direct to the diverter valve 10, or first caused to pass through the cooler 33, and thence to the diverter valve 10, depending on the temperature of said lubricating oil. When the oil is warmed up sufficiently to be passed through cooler 33, the valve gate 11 of the diverter valve 10 will have assumed the position shown in Figure 1 in which the valve gate has been moved to a normal closed position closing off by-pass port 19 and opening outlet port 24 to direct substantially all of the cooled oil directly into the main storage portion 34 of the storage tank 35 where the air still carried thereby percolates to the top allowing the oil in an air-free condition to settle to the bottom of the tank ready to be drawn from the oil sump 36 and pumped by supply pump 37 to the engine 30 as needed. The oil being in proper condition for use will show a steady pressure on gauge 41 mounted on the pilot's instrument panel.

While I have described my invention in detail in its present preferred embodiment, it will be obvious to those skilled in the art after understanding my invention that various changes and modifications may be made therein without departing from the spirit and scope of the appended claims.

I claim as my invention:

1. In a valve for diverting the flow of lubricant in a lubricating system comprising a housing having an inlet port and an opposed outlet port and an intervening second outlet port, a rotary flow control gate mounted on a shaft in said housing spaced opposite said second outlet port, gate actuating means including a solenoid for moving the gate in a predetermined manner to close said outlet ports alternately, a flow directing means provided with a plate positioned transverse of the inlet to direct a portion of the oil entering the valve away from the gate when in a closed position over the second mentioned outlet port.

2. In a valve for diverting the flow of lubricant in a lubricating system comprising a housing having an inlet port and a plurality of outlet ports, a flow control gate mounted for rotative movement about a centered axis in said housing, gate actuating means adapted to move the gate in a predetermined manner to close one of said outlet ports while opening another outlet port, a flow directing means provided with a surface transverse of the inlet spaced from said gate between said inlet and the axis about which said gate is positioned to rotate for directing the main flow of oil entering the valve through said inlet port away from the gate when moved to a substantially closed position over said one outlet port.

3. In a valve for directing a flow of lubricant in a lubricating system comprising a housing having a rotary valve chamber separating an inlet port from a plurality of outlet ports, a rotary valve gate mounted for rotative movement inside of said valve chamber, gate actuating means to move the gate in a predetermined manner to close one of said ports, a flow directing plate spaced between said gate and the inlet port positioned to direct the flow of oil away from the face of the gate when the gate is moved rotatively to a closed position over another port.

4. In a valve structure for directing a flow of lubricant in an aircraft lubricating system, a housing, a cylindrical cavity, a shaft centered in said cavity with ends mounted in the housing, a valve inlet opening, a valve outlet opening positioned approximately opposite said inlet opening, a second outlet opening spaced approximately midway between the inlet and first mentioned outlet, a rotary valve gate means mounted on said shaft for rotative movement, control means to rotate said rotary valve gate to alternately close said outlet openings, a deflecting means mounted on the centered shaft including supporting side arms dependent from said shaft, said deflecting means provided with a surface transverse of the inlet supported by the arms spaced from said inlet opening and the valve gate for directing a flow of oil toward the first mentioned outlet opening and away from said second outlet opening with securing means affixed to the deflecting surface for maintaining said surface at a given plane.

5. In a valve structure for directing a flow of lubricant in an aircraft lubricating system, a housing, a cylindrical cavity, a shaft centered in said cavity with ends mounted in the housing, a valve inlet opening, a valve outlet opening positioned approximately opposite said inlet opening, a second outlet opening spaced approximately midway between the inlet and first mentioned outlet, a rotary valve gate means mounted on said shaft for rotative movement, control means for rotating said rotary valve gate to close said outlet openings, a deflecting means including a sloping surface transverse to the axial center line of the inlet opening spaced adjacent thereto for directing a main flow of oil entering the cylindrical cavity away from the valve gate when positioned over the second mentioned outlet.

6. In a valve structure for directing a flow of lubricant in an aircraft lubricating system, a housing, a generally cylindrical cavity, a shaft centered in said cavity with ends mounted in the housing, a valve inlet opening, an opposed valve outlet opening positioned approximately opposite said inlet opening, a second outlet opening spaced approximately midway between the inlet and first mentioned outlet, a rotary valve gate means mounted on said shaft for rotative movement, control means for rotating said rotary valve gate to close said outlet openings, a deflecting means mounted on said shaft including side arms dependent from said shaft, a deflecting plate having a fixed position transverse of the inlet with a plane surface slanted upwardly toward the opposed outlet positioned approximately opposite the inlet and spaced from said inlet opening and valve structure to direct the flow of oil entering through said inlet toward said opposed outlet opening.

7. In a valve structure, a housing, a valve cavity, a shaft centered in said cavity as a supporting means, a valve inlet opening, a plurality of valve outlet openings, a rotary valve gate rotatively mounted on said supporting shaft, control means for moving the valve gate to alternately close said outlet openings, a deflecting means comprising support means dependent from said shaft, a deflecting plate fixed to said support means spaced adjacent the inlet opening and valve structure for deflecting the main flow of fluid passing through the valve away from the valve gate when closing certain of said outlet openings.

SAMUEL K. BAKER.

REFERENCES CITED

The following references are of record in the file of this patent:

UNITED STATES PATENTS

| Number | Name | Date |
|---|---|---|
| 472,579 | Lundstedt | Apr. 12, 1892 |
| 1,053,327 | Stebbins | Feb. 18, 1913 |
| 1,448,941 | Powell | Mar. 20, 1923 |